(No Model.)

I. N. ELLIS & R. W. RULE.
FRICTION CLUTCH.

No. 247,896. Patented Oct. 4, 1881.

ATTEST:
E. B. Bolton
Geo. Bainton

INVENTORS:
Isaac N. Ellis and
Robert W. Rule,
By their Attorneys,
Burke, Fraser & Cornett

UNITED STATES PATENT OFFICE.

ISAAC N. ELLIS AND ROBERT W. RULE, OF AYLMER, ONTARIO, CANADA; SAID RULE ASSIGNOR TO CHARLES W. CLARK, OF SAME PLACE.

FRICTION-CLUTCH.

SPECIFICATION forming part of Letters Patent No. 247,896, dated October 4, 1881.

Application filed March 1, 1881. (No model.) Patented in Canada December 2, 1878.

*To all whom it may concern:*

Be it known that we, ISAAC N. ELLIS and ROBERT W. RULE, both subjects of the Queen of Great Britain and residents of Aylmer, Ontario, Canada, have invented certain Improvements in Friction-Clutches, of which the following is a specification.

This is a division of the application filed by us October 19, 1878, for the other division of which a patent was granted to us June 19, 1879, numbered 216,560.

This invention relates to that class of clutches which comprise a toggle pivoted at one end to the shaft, or to a boss thereon, and arranged to take under a shoe or brake which fits the internal periphery of a drum or pulley that is mounted loosely on the shaft.

The invention consists, essentially, in providing a segmental shoe made in two or more parts to fit the internal periphery of the drum or pulley, and arranging wedge-shaped expanders between the beveled ends of said segments, which expanders are adapted to force the latter against the inside surface of the pulley by the straightening of the toggles, all as will be more fully hereinafter set forth.

Figure 1:
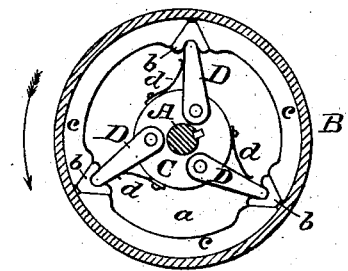
Figure 5:
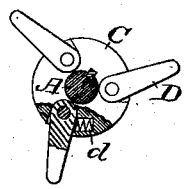
Figure 6:
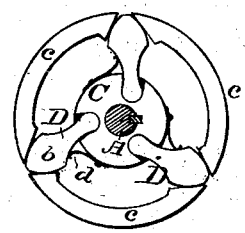
Figure 2:
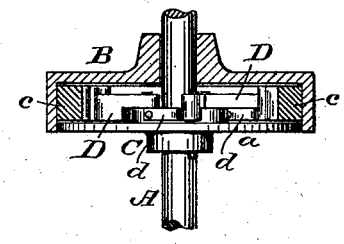
Figure 3:
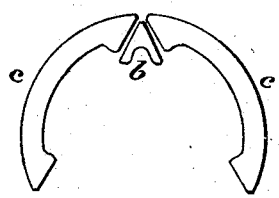
Figure 4:
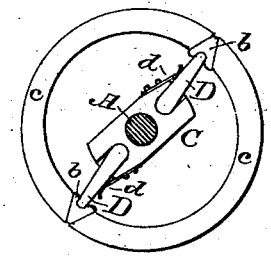

In the drawings which serve to illustrate our invention, Figure 1 is a side view of the clutch, the pulley or drum being in section. Fig. 2 is an edge view, the pulley or drum and the segmental shoe being in section. Fig. 3 is a detached view, showing the segments and an expanding-wedge. Figs. 4, 5, and 6 illustrate modifications of the clutch, which will be referred to more particularly hereinafter.

Let A represent a shaft capable of rotation or oscillation, and B a drum or pulley mounted loosely thereon and having the inner periphery of its overhanging rim turned true and even.

C is a clutch-boss, which is keyed or otherwise fixed to the shaft A, and is, by preference, provided with a cap-plate, *a*, to close the opening in the pulley and house the clutch mechanism.

D D are toggles hinged to the boss C. These toggles are of such a length as to stand a little obliquely to the radius, as shown, and their outer ends take into slight recesses in expanding-wedges *b*, arranged between the beveled ends of segments or shoes *c c*, which are made to fit the internal periphery of the pulley B.

We may employ two or more toggles, segments, and expanders, but prefer three, as bringing to bear an equally-distributed pressure on the pulley-rim.

Springs *d d* are employed to exert a slight elastic pressure on the toggles, tending to bring them to a radial position. These may be leaf-springs, as shown in Fig. 1, or they may be spirals placed in a socket bored in the boss C, as shown in Fig. 5; or any other suitable form of spring may be employed.

This clutch is intended to act upon and rotate the pulley when the shaft is rotated in one direction, but not to act upon it when rotated in the other direction. When the shaft is rotated in the direction of the arrow, Fig. 1, the tendency is to straighten the toggles, and this causes them to drive the expanding-wedges forcibly between the segments, and thus press the latter into close frictional contact with the periphery of the pulley. Thus the pulley is carried around with the clutch. But if the shaft be turned in the opposite direction the toggles do not exert any pressure on the wedges, and the clutch rotates inside the pulley or drum without disturbing it. Motion may be communicated from the pulley to the shaft instead of from the shaft to the pulley.

Where three segments *c* are employed, we prefer to cut the bevel on the ends of each segment in the same plane—that is, in the plane of a chord which subtends about one hundred and twenty degrees. This, we think, gives the best results.

In Fig. 4 we have shown but two segments *c*, and in this and the following figures we have shown the inner ends of the toggles stepped in sockets in the boss instead of hinged or pivoted thereto.

It is not important or even desirable that the segments be brought closely together at the ends. The wedges will fill up the intervening space.

It is not absolutely essential that the wedges *b b* be made separate pieces from the toggles D, although we consider it preferable that they be so made. In Fig. 6 we have shown the wedges as formed on the ends of the toggles, their sides being curved to admit of the radial movement of the toggles.

We are aware that friction-clutches employing a divided ring arranged to be expanded by a wedge forced outward radially by means of a wedging-collar playing on a spline on the shaft has been employed in connection with a pulley mounted loosely on the shaft; but this is simply a clutch to fix the pulley to its shaft at any time or release it at any time, the shaft revolving in one direction. The object of our clutch is to fix the pulley to the shaft when it is revolving in one direction only, and to permit it to turn freely on the shaft when revolving in the other direction. The clutch works automatically and only operates under certain conditions.

Having thus described our invention, we claim—

1. In an automatic friction clutch for pulleys, a segmental expanding ring arranged to be expanded by the rotation of the pulley-shaft in one direction through the medium of wedging-toggles hinged to the shaft, or to a boss fixed thereon, substantially as and for the purposes set forth.

2. An automatic friction-clutch comprising a pulley or drum loosely mounted on a shaft, a series of segments or segmental shoes with beveled ends, forming, when in place in the drum, a substantially complete circle, and toggles hinged to the shaft, or a boss fixed thereon, with their outer ends provided with wedges arranged to engage or take between the beveled ends of the segments and spread the same, whereby the shaft is caused to rotate with the drum or pulley in one direction, and to rotate independently of it in the other direction, substantially as set forth.

3. An automatic friction-clutch for pulleys comprising the following coacting elements—that is to say: a drum or pulley mounted loosely on a shaft, the said shaft mounted rotatively, beveled segments $c\ c$, toggles D D, arranged to abut against the said shaft and provided with springs $d\ d$, and wedges or expanders $b\ b$, arranged between the beveled ends of the segments and over the outer ends of the toggles, whereby, when the shaft is rotated in one direction, the said expanders will be forced outward between the beveled ends of the segments, substantially as and for the purposes set forth.

In witness whereof we have hereunto signed our names in the presence of two subscribing witnesses.

ISAAC N. ELLIS.
                ROBERT W. RULE.

Witnesses:
  ARCHIE WALKER,
  JUNIUS BRADLEY.